United States Patent
Menegoli (10) Patent No.: US 9,525,311 B2
(45) Date of Patent: Dec. 20, 2016

(54) WIRELESS POWER TRANSMISSION IN PORTABLE COMMUNICATION DEVICES

(71) Applicant: Paolo Menegoli, San Jose, CA (US)

(72) Inventor: Paolo Menegoli, San Jose, CA (US)

(73) Assignee: Nirvanalog Inc., San Jose, CA (US)

( * ) Notice: Subject to any disclaimer, the term of this patent is extended or adjusted under 35 U.S.C. 154(b) by 245 days.

(21) Appl. No.: 14/018,691

(22) Filed: Sep. 5, 2013

(65) Prior Publication Data
US 2015/0102680 A1    Apr. 16, 2015

(51) Int. Cl.
*H02J 17/00*    (2006.01)

(52) U.S. Cl.
CPC .............. *H02J 17/00* (2013.01); *H02J 50/15* (2016.02); *H02J 50/20* (2016.02); *H02J 50/30* (2016.02); *Y02B 60/50* (2013.01)

(58) Field of Classification Search
CPC ............ H02J 17/00; H02J 50/05; H02J 50/10; H02J 50/12; H02J 50/15; H02J 50/20; H02J 50/23; H02J 50/27; H02J 50/30; H02J 50/40; H02J 50/50; H02J 50/60; H02J 50/70; H02J 50/80; H02J 50/90
USPC ......................................... 307/104; 320/108
See application file for complete search history.

(56) References Cited

U.S. PATENT DOCUMENTS

| | | | |
|---|---|---|---|
| 4,041,954 A * | 8/1977 | Ohara | A61N 1/3787 128/908 |
| 7,511,630 B2 * | 3/2009 | Strickland et al. | 340/815.4 |
| 7,894,910 B2 * | 2/2011 | Cowan et al. | 607/57 |
| 8,175,660 B2 * | 5/2012 | Porwal | H02J 17/00 455/343.1 |
| 8,295,941 B2 * | 10/2012 | Hyde | A61N 1/08 607/61 |
| 8,639,347 B2 * | 1/2014 | Hyde | H02J 7/025 607/60 |
| 2005/0151511 A1 * | 7/2005 | Chary | 320/127 |
| 2009/0072782 A1 * | 3/2009 | Randall | G06F 1/1616 307/104 |
| 2009/0108679 A1 * | 4/2009 | Porwal | H02J 17/00 307/104 |
| 2010/0295372 A1 * | 11/2010 | Hyde | H02J 7/025 307/48 |
| 2012/0113576 A1 * | 5/2012 | Cooper et al. | 361/679.02 |
| 2012/0262004 A1 | 10/2012 | Cook et al. | |

* cited by examiner

*Primary Examiner* — Fritz M Fleming (57) ABSTRACT

The present invention describes means to intentionally transmit power wirelessly from a portable communication device like a mobile phone, smart-phone, tablet or telephone watch using radio frequency, ultrasound, microwave or laser technologies to power up or charge devices external to the portable communication device. In particular the wireless power transmitter is physically placed inside the portable communication device or coupled to it, in order to have a means to transfer power without wires or cables to other devices. The present invention may be utilized in applications like sensors, implanted devices for medical use, speakers, mouse, keyboard, electrical glasses for 3D viewing, small displays, gadgets in the car, electronic toys and so on.

14 Claims, 10 Drawing Sheets

WIRELESS POWER TRANSMISSION IN PORTABLE COMMUNICATION DEVICES

RELATED APPLICATION DATA

The present application claims priority from U.S. Provisional Patent Application No. 61/733,860 for "Wireless Power Transmission in Mobile Phones and Tablets" filed on Dec. 5, 2012.

BACKGROUND OF THE INVENTION

1. Field of the Invention

The present invention is in the field of wireless power transfer. The present invention is further in the field of radio-frequency power transfer. The present invention is further in the field of ultrasound power transfer. The present invention is further in the field of wireless power transfer within mobile telephones and tablets. The implementation is not limited to a specific technology, and applies to either the invention as an individual component or to inclusion of the present invention within larger systems which may be combined into larger integrated circuits.

2. Brief Description of Related Art

With the proliferation of portable devices there is a growing demand for battery charging means that are efficient and user friendly. One of the most recent methods of charging the portable communication devices, as the likes of cellular telephones and tablets, is the utilization of wireless power transfer, that is without the use of wired charger or wall warts.

Nowadays there are typically two ways to achieve the charging by Radio-Frequency (RF) means: the first one is inductive coupling and the second one is RF resonating near field energy transfer. Inductive coupling is related to the way that power is transferred in a transformer. The magnetic field generated between the primary and the secondary windings of the transformer generates current in the secondary that can be rectified and processed for charging the battery. This first method is quite efficient but it requires that the primary and secondary windings be located very close to each other. In addition any foreign object made of metallic material can adversely interfere the energy transfer operation causing the efficiency to drop significantly while overheating the foreign object.

In the case of Radio Frequency resonating near field energy transfer the operation is similar to the common data radio communication between two points, with the difference that the energy radiated and, most importantly, the energy captured by the receiver is several orders of magnitude higher than the one used for data communication. A resonating circuit at the receiver side is tuned to the same frequency of the transmitter in order to capture most of the radiated energy at that frequency. However also in this case the magnetic field is the main media for energy transfer and generally the transmitter and the receiver have to be in close proximity of each other.

Both methods have been studied and employed to charge the battery of a cellular telephone, of a smart-phone or of a tablet. In these systems the power transmitter is located somewhere in proximity of the portable device and the wireless power receiver is positioned inside the device itself. For example Cook et al (US 2012/0262004) describes a typical charging system where the charger is clearly external to the portable communication device. In the case of smart-phones and tablets, two consortia of several companies were created to define the standards of the wireless power transfer parameters.

SUMMARY OF THE INVENTION

Smart-phones, tablets, telephone watches, or what are generally defined as portable communication devices, today are truly ubiquitous and they could be used, not only to transmit data and voice over the network, but also to wirelessly power other devices in their relative proximity or charge the battery of other devices. Examples of such applications could be the powering of sensors or implanted devices for medical use or any other use (activate speakers, or powering a mouse, electrical glasses for 3D viewing, small displays, gadgets in the car, electronic toys and many others).

In all these potential applications, in order for the smart-phone (or any other portable communication device), to transmit power wirelessly, the power transmitter has to be physically placed in the portable communication device (e. g. smart-phone), or connected to it such that the power from the portable communication device is used, and this is novel with respect to what commonly done nowadays. In particular the smart-phones and tablets have RF transmitters but they are used to transmit data and not power.

However one of the challenges, that has to be overcome, is that generally these wireless power transmission methods are still quite inefficient or impractical. Since the cellular telephone device is a battery operated device, the source of power is typically limited and valuable. However in the near future there will be various applications, especially in the medical field, in which the amount of energy to be transferred will not be very significant. Therefore, allowing the cellular phones, or tablets, or telephones watches to transfer energy wirelessly, while technically challenging, is very desirable.

The mobile payment methods, used by cellular phones utilizing NFC, are generally non passive therefore the reader and the transmitter are powered up on their own, however, in some cases, the telephone may power up the passive NFC reader, but the power involved is very small (in the case of mobile payment methods this is also due to security reasons to prevent undesired interception of data and information theft) and typically done through inductive coupling.

In addition to Radio Frequency (RF) power transmission and reception, according to other embodiments of the present invention, the power can be transmitted from the smart-phone or tablet by using a different physical mechanism. For instance the power could be transmitted by using mechanical ultrasounds that are generated inside the cellular telephone device and are received and transformed into electrical energy by using a piezoelectric sensor within the device that receives the ultrasound energy.

One typical application for such a system could be the medical implanted devices and in particular the deep implanted devices since the ultrasounds can travel deeper than RF within the human body without damaging the tissues. The frequency of the ultrasounds could be between 1 and 2 MHz, but other frequencies could be used as well (typically frequencies above 20 KHz are considered ultrasounds).

The advantages of these ultrasound systems are that the properties of ultrasounds are much more known and understood, in terms of interaction with the human body, they are known to be non harmful, they are more immune to RF interference and the piezoelectric transducer in the receiver generates typically high enough voltages to be more easily rectified and processed.

Other mechanisms to transmit power wirelessly are the laser or microwave. Although these methods might be more difficult to implement, further embodiments of the present patent application are comprising the possibility to have a laser or a microwave generator within the portable communication device to transmit power to an external device.

Energy scavenging from cellular telephones radiated energy (more specifically from the base stations) has been studied, and in some instance also applied, but in that case the transmission of power from the cellular phones is for other purposes (more specifically to transmit data and to communicate in general), and the reception and use of very small amounts of power is difficult to obtain for the insignificant level of energy that is radiated. The present invention describes a means to intentionally transmit RF, ultrasound, microwave or laser power from portable communication devices, like smart-phones and tablets, to power up or charge batteries or energy storage elements within devices external to the portable communication devices.

BRIEF DESCRIPTIONS OF THE DRAWINGS

The features, objects, and advantages of the present invention will become apparent upon consideration of the following detailed description of the invention when read in conjunction with the drawings in which.

DETAILED DESCRIPTION OF SPECIFIC EMBODIMENTS

A FIG. 1

Figure 1:
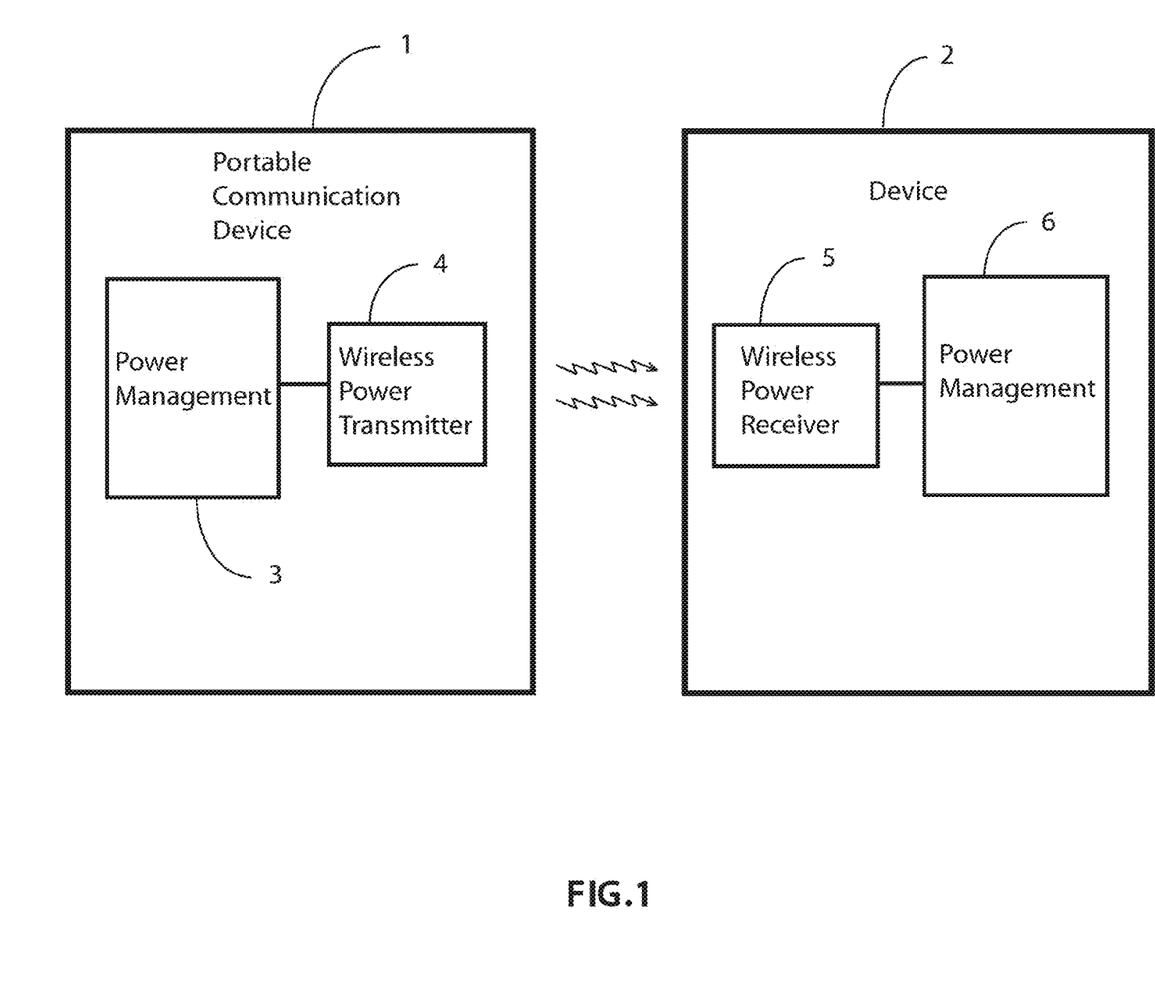
FIG. 1 shows a general block diagram for wireless power transmission from a portable communication device according to a first embodiment of the present invention.

As shown in FIG. 1 a portable communication device 1 (mobile telephone or tablet), according to one general embodiment of the present invention, includes a wireless power transmitter 4 to transmit power to an external general device 2 which will comprise a wireless power receiver 5. A power management unit 3 in the cellular telephone may include the battery and devices to efficiently manage power to be transmitted and likewise in the external device the power received from the receiver is passed to a power management block 6 that may include circuits to convert the power to electric power, and a battery charger or direct means for utilizing the power received.

In particular, the use of a cellular telephone or tablet or telephone watch to wirelessly transmit power, makes the software for the utilization of the energy provider easy to program as an application of the telephone. It can be run simultaneously to other features of the portable telephones. The inherent programmability, flexibility and processing features of modern portable communication devices constitutes a great advantage to the use of wireless power transmission from within these devices.

The advantages of using smart-phones, tablets or other common communication portable devices are various. Once a standard protocol has been established, many devices could use the same frequency, and compatible receivers to obtain power without the need for wires, batteries and other conventional means to provide power to devices. In the case of multiple receivers the power can be equalized or prioritized by software programs that run on the portable communication device as long as the wirelessly energy transfer hardware has been made sufficiently programmable. The programmable parameters may include the frequency of transmission, the transmitted power, the timing of the wireless power transmission and others.

B FIG. 2

Figure 2:
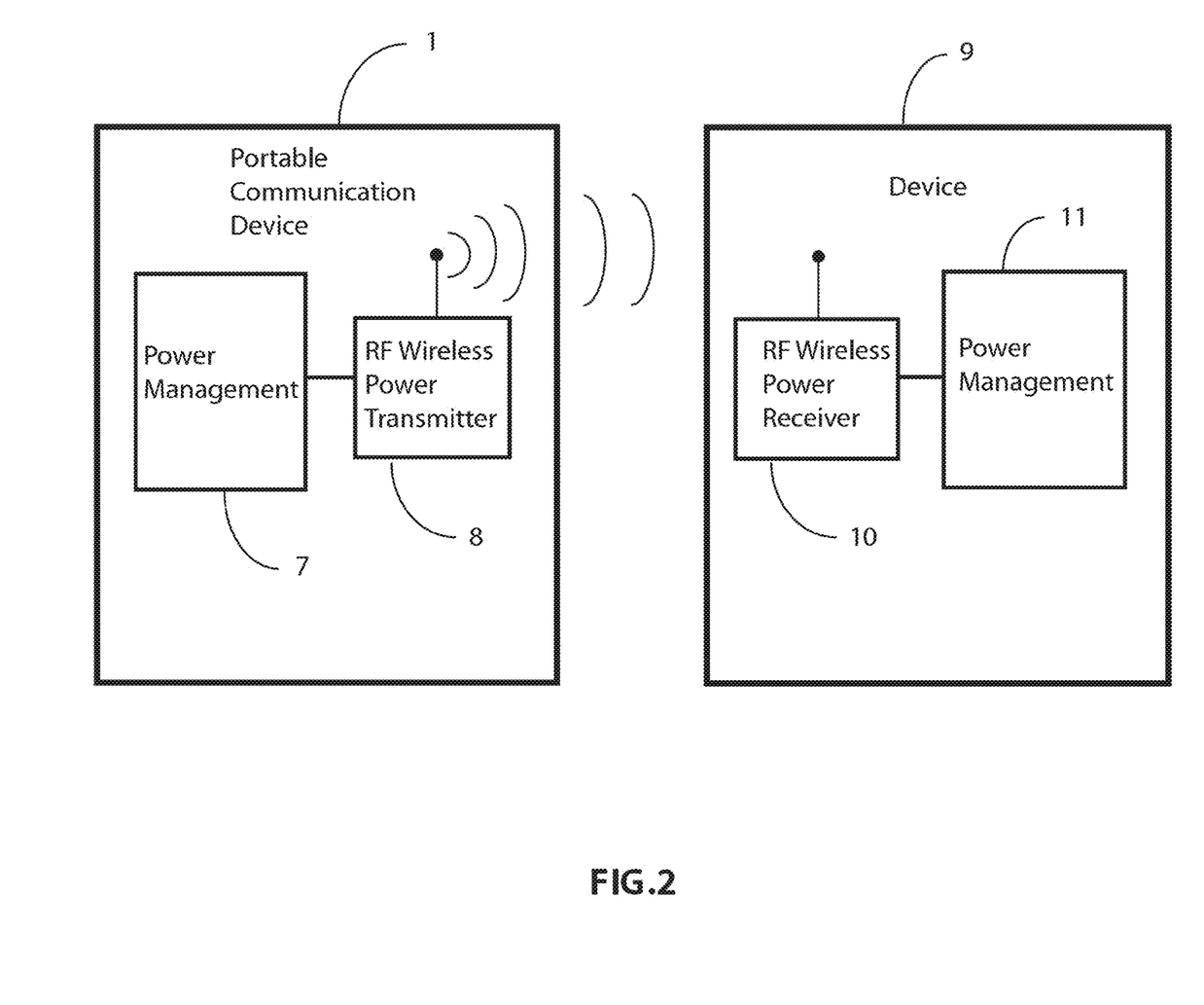
FIG. 2 shows a second more specific embodiment of the present invention where the wireless power is transferred by means of Radio Frequency transmission and reception.

FIG. 2 shows a more specific embodiment of the present invention according to which the wireless power is transferred by means of Radio Frequency power transmission. The RF power transmission could be Near Field Transmission, where the magnetic field is stronger than the Electric Field, or, in case of greater distances between the transmitter and the receiver with respect to the dimension of the antenna and frequency of operation, Far Field Transmission, where the electric field accounts for most of the energy transferred. Both methods make use of resonant networks to couple the circuits and achieve maximum transfer of energy.

Therefore it is quite important to make sure that the two circuits are perfectly tuned at the desired frequency. It is plausible to envision an adaptive tuning mechanism of the resonant networks to optimize the power transfer. For example tunable elements like MEMS variable capacitors, varactors or transcap components may be used.

Furthermore it is of paramount importance that, independently from the operating conditions, the Voltage Standing Wave Ratio be close to 1:1, so that the amount of reflected energy is minimized. In fact, if the antenna impedance is not matched to the transmitting power amplifier, most of the power may be reflected and therefore not radiated, thus impacting very negatively the power transfer mechanism and its efficiency.

FIG. 2 depicts an RF wireless power transmitter 8 with a little antenna to radiate the energy. Again a power management block 7 is used to provide the necessary power to the transmitter 8. The external dedicated device 9 comprises an RF wireless power receiver 10 to capture the radiated energy at the RF frequency, to transfer the power to the power management block 11, and to convert the energy at the desired voltage and current for the specified use in the device 9.

For the case of RF wireless power transmission it is important to use the spectrum made available. For instance the devices can operate at the ISM bands or other allowed bands. It is also very important to pay attention to the levels of power being radiated out of the smart-phone or equivalent portable communication device, in order to limit the electromagnetic field radiations near the human body. It has been studied that high levels of EM radiations can be absorbed by the human body, possibly causing negative effect on our health. It is for this reason that other mechanisms, like the ultrasounds, may be preferable.

While it is less critical for the case of tablets or larger portable communication devices, it is important to select the right frequency of operation also because the size of the antenna largely depends on it. In a cellular telephone, let alone in a telephone watch, the size and space limitations would most likely determine the band to be in the order of hundreds of MHz, possibly affecting the efficiency of the wireless power transfer.

C FIG. 3

Figure 3:
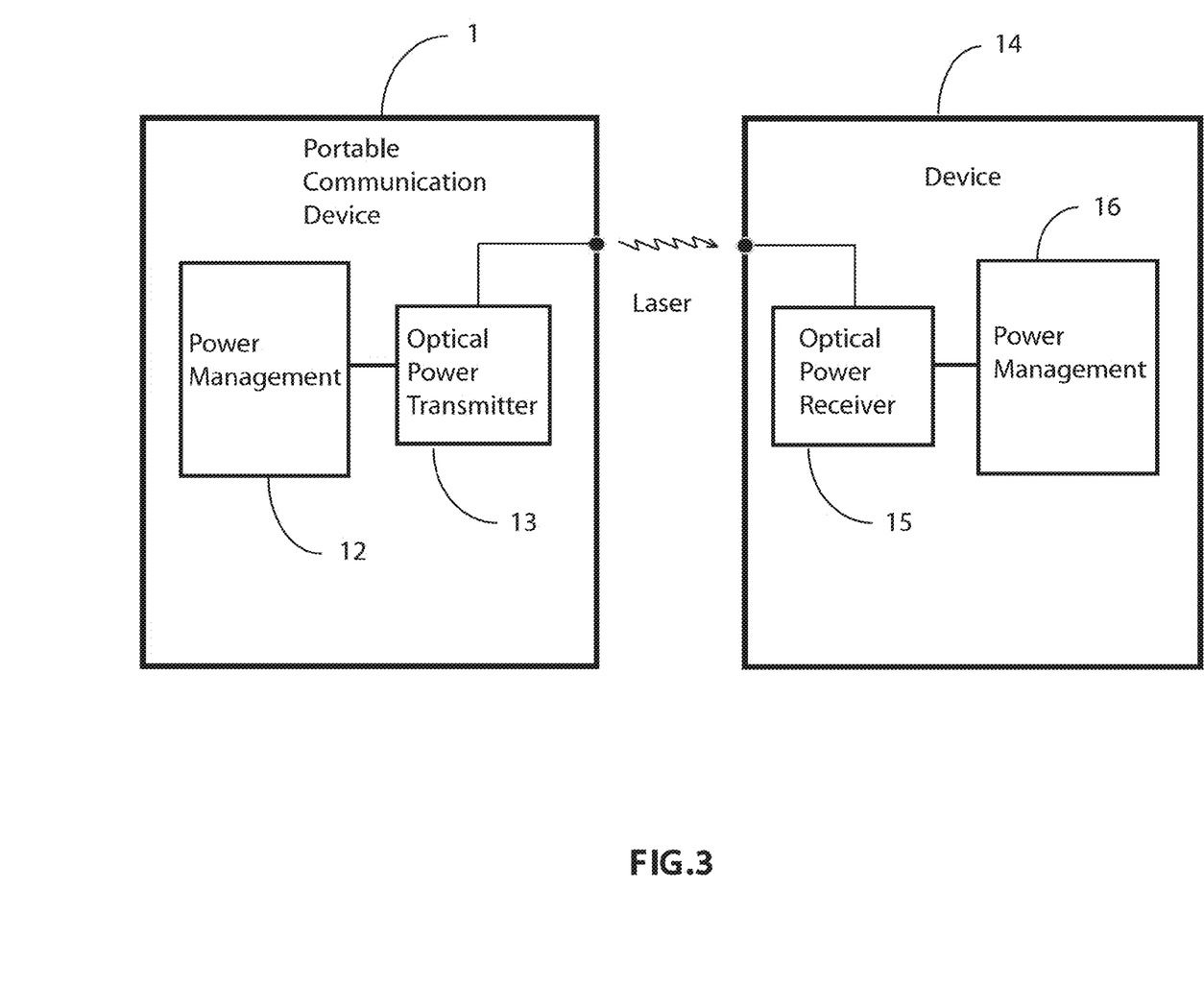
FIG. 3 shows a further embodiment of the present invention according to which the wireless power is transferred by means of optical power transmission and reception.

FIG. 3 shows a further embodiment of the present invention according to which the wireless power is transferred by means of optical means. For instance the wireless power can be transmitted by means of laser or coherent light beams. In this case the optical power transmitter 13 includes the means to convert electric energy into optical energy and the optical power receiver 15, includes means to convert it back to electric energy. In this case the portable communication device 1 and the external device 14 can be at a considerable distance from each other, but they have to be in sight.

However an adaptive mechanism to seek and position the receiving device can be implemented to center the beam to the receiving aperture of the device 14. The advantages of using optical devices are numerous, for instance a laser does not require a large antenna, but there are also drawbacks like the use of significant power from the portable communication device which is generally a battery operated device. However the transfer of energy could be quite efficient.

It should be mentioned that examples of use of laser devices in cellular telephones are known, but not for the reasons specified in the present invention, that is to transfer power from the portable communication device to a second external dedicated device. There are examples of use of laser devices to project intense light for applications like image projectors from cellular telephones.

D FIG. 4

Figure 4:
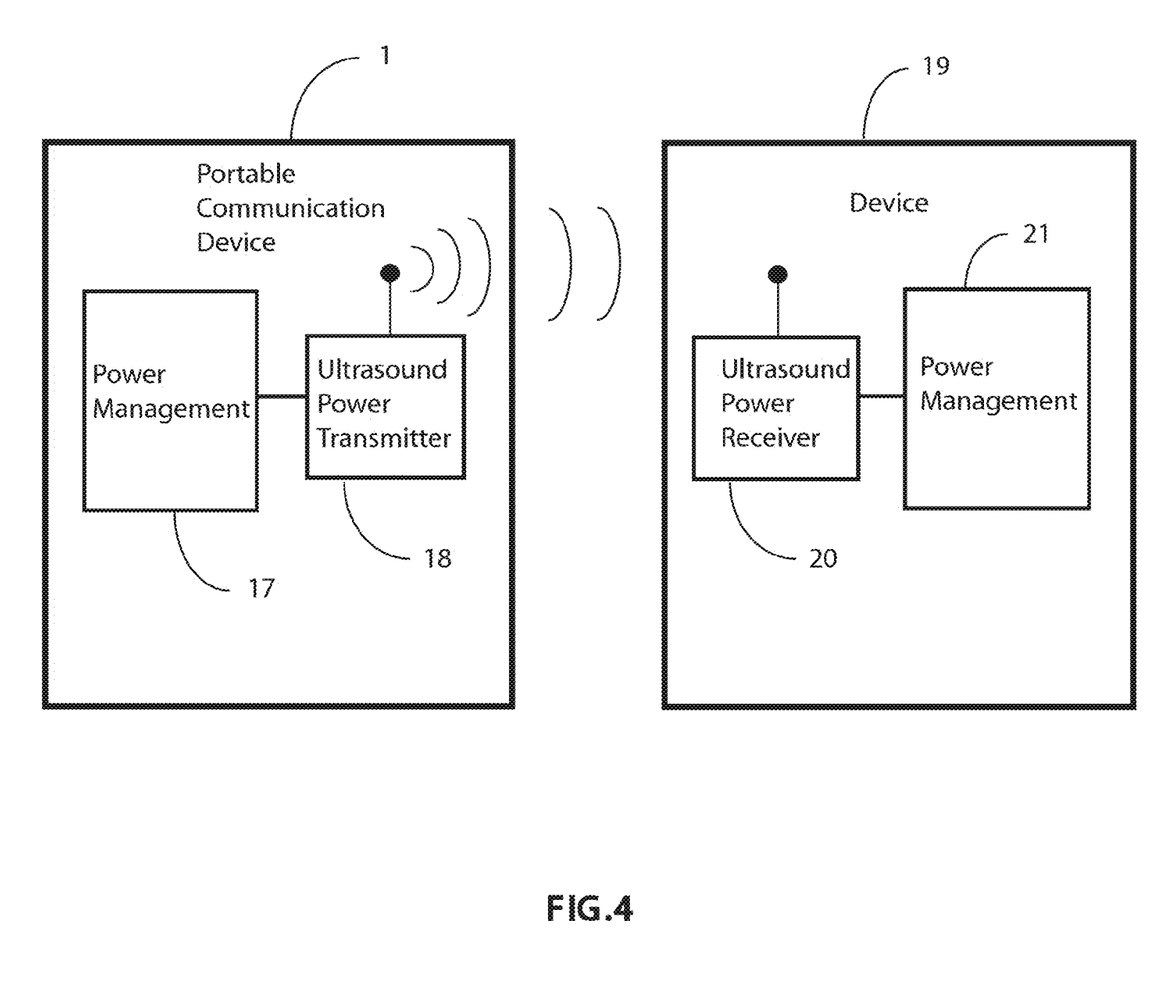
FIG. 4 shows a further embodiment of the present invention according to which the wireless power is transferred by means of ultrasound power transmission and reception.

FIG. 4 shows a further embodiment of the present invention according to which the wireless power is transferred by ultrasound transducers. The use of ultrasound (or high frequency mechanical waves) to transfer power is quite interesting because considered very safe. In this case the ultrasound power transmitter 18 may be implemented by a small speaker that vibrates at much higher frequencies than the audible range (for instance in the order of a few MHz) or simply by a piezoelectric transducer that converts electric energy in ultrasound waves. Also the ultrasound power receiver 20 is a piezoelectric transducer to reconvert back the mechanical energy into electric energy by resonating at the desired frequency.

The use of ultrasound is of particular interest for medical applications and more specifically for transferring power to implanted devices, since the ultrasounds are able to penetrate deeper in the animal tissue than RF waves, and have been studied for a very long time. The use of smart-phone, or other portable communication devices like a tablet, to charge or power up implanted medical devices is a very interesting application.

For medical devices the use of password and encrypted information before allowing the transfer of power between the cellular telephone and the implanted device may be relatively simple and desirable. Fingerprint and biometrics could be some of the alternatives. Furthermore the data from the implanted devices, once it is transferred to the portable communication device, can be easily sent to the desired personnel via general cellular telephone network in real time. This can be utilized for diagnostic methods or for any other therapeutic methodology.

E FIG. 5

Figure 5:
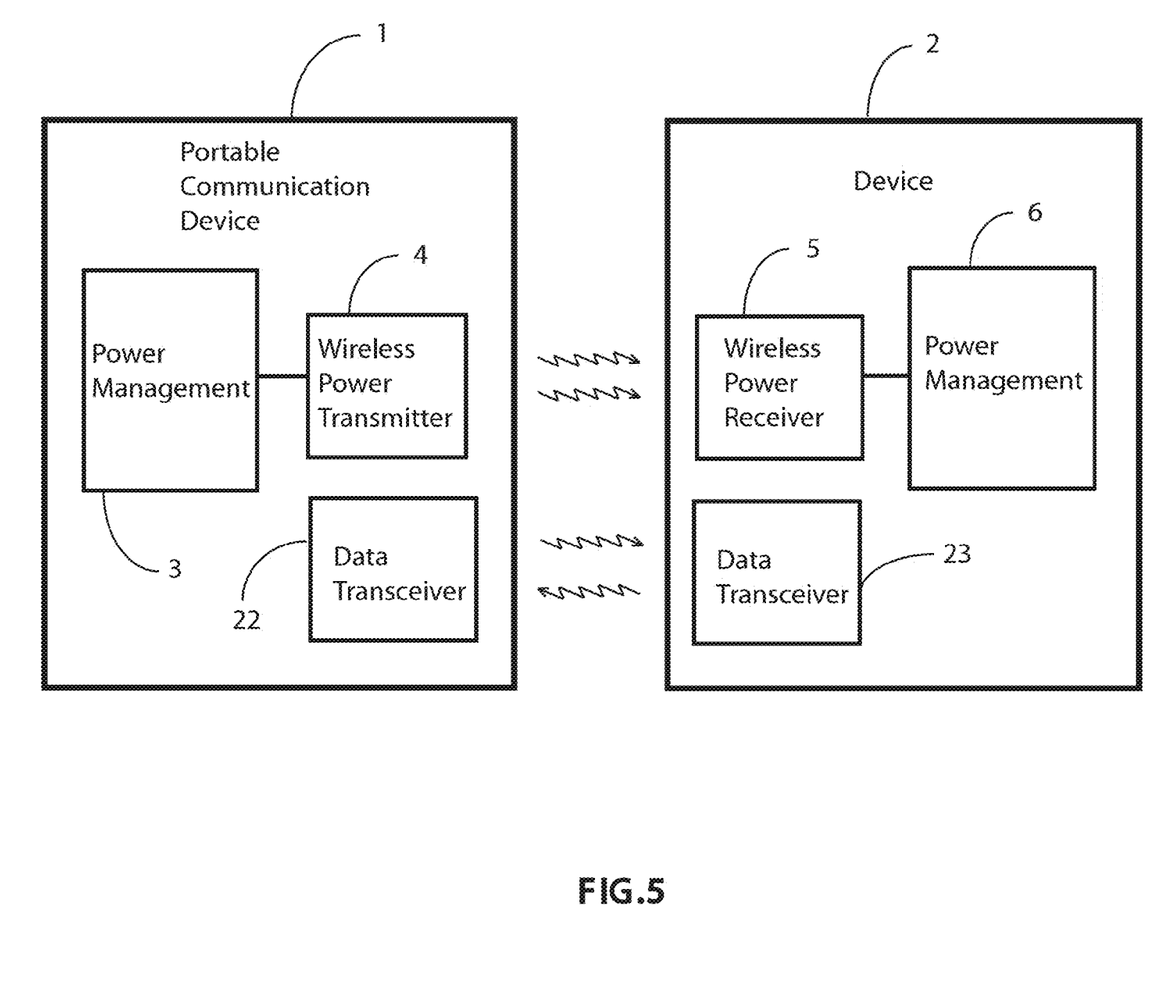
FIG. 5 shows a further embodiment of the present invention according to which wireless power is transmitted from the portable communication device simultaneously with data transmission and reception.

FIG. 5 shows a further embodiment of the present invention according to which the transfer of wireless power between the portable communication device 1 and the general device 2 occurs simultaneously with the data (or voice) communication. For example, the data transceivers 22 and 23 can communicate and exchange data, while the power transmission between the transmitter 4 and the receiver 5 is occurring. In case the wireless power transmission occurs by means of RF link, the data transmission can also occur by modulating the carrier of the RF power transmission.

In another embodiment, the device 2 can be powered up or charged by the wireless power transmission and reception, while the two devices exchange data.

F FIG. 6

Figure 6:
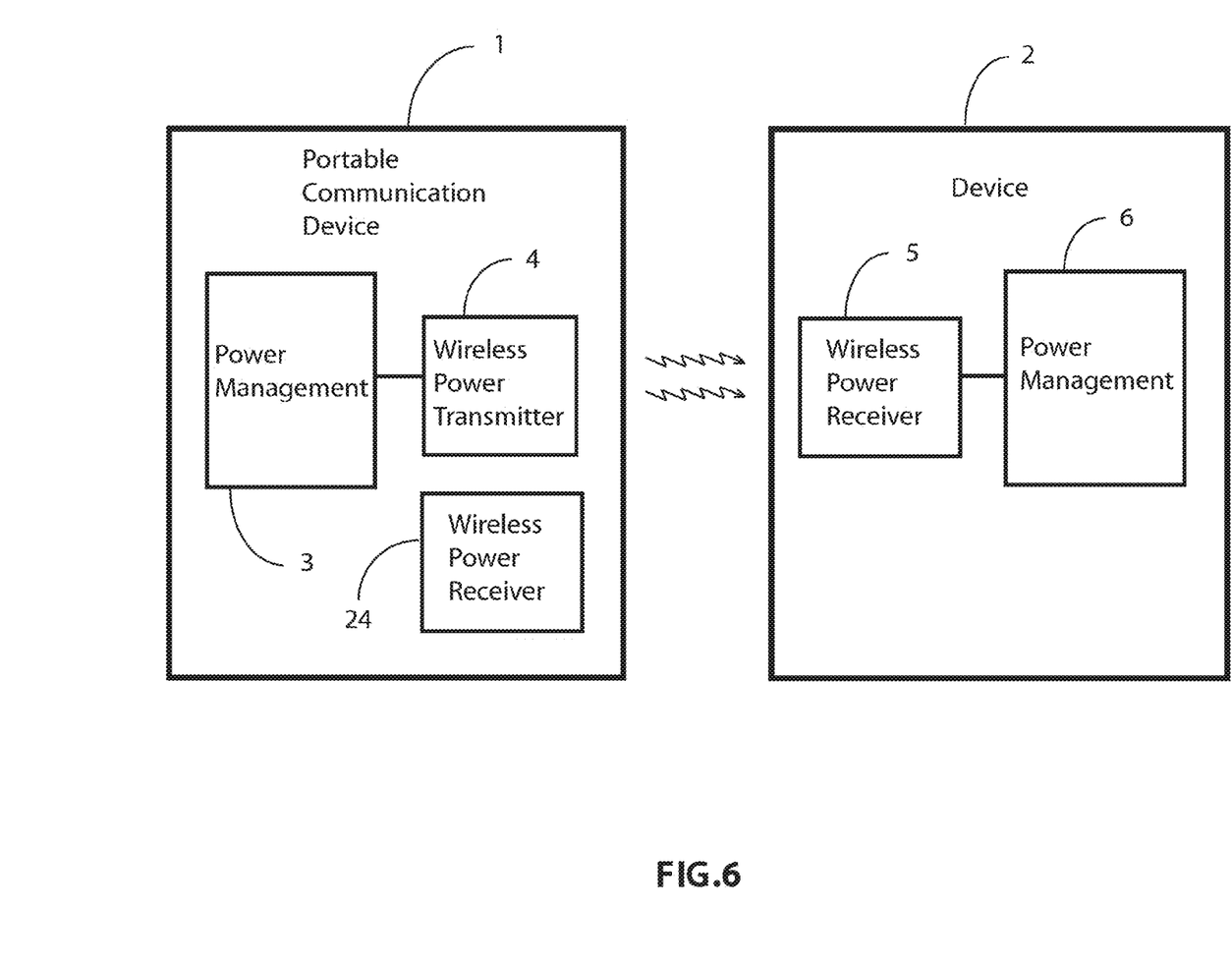
FIG. 6 shows a further embodiment of the present invention according to which the portable communication device further comprises means for receiving wireless power.

FIG. 6 shows a further embodiment of the present invention according to which the portable communication device 1 is equipped also with a wireless power receiver 24, so that it can receive wireless power as well in addition to transmitting wireless power. In case the mechanism of wireless power transmission is the same as the one for reception, for instance RF, it is reasonable to think that both the battery charging of the smart-phones and the energy transfer out of the smart-phones can be done easily and in some cases even simultaneously. It is also possible that the transfer of energy in and out of the smart-phones, or in general for portable communication devices, can be achieved by the same antennas, like it occurs for today's data communication hardware.

G FIG. 7

Figure 7:
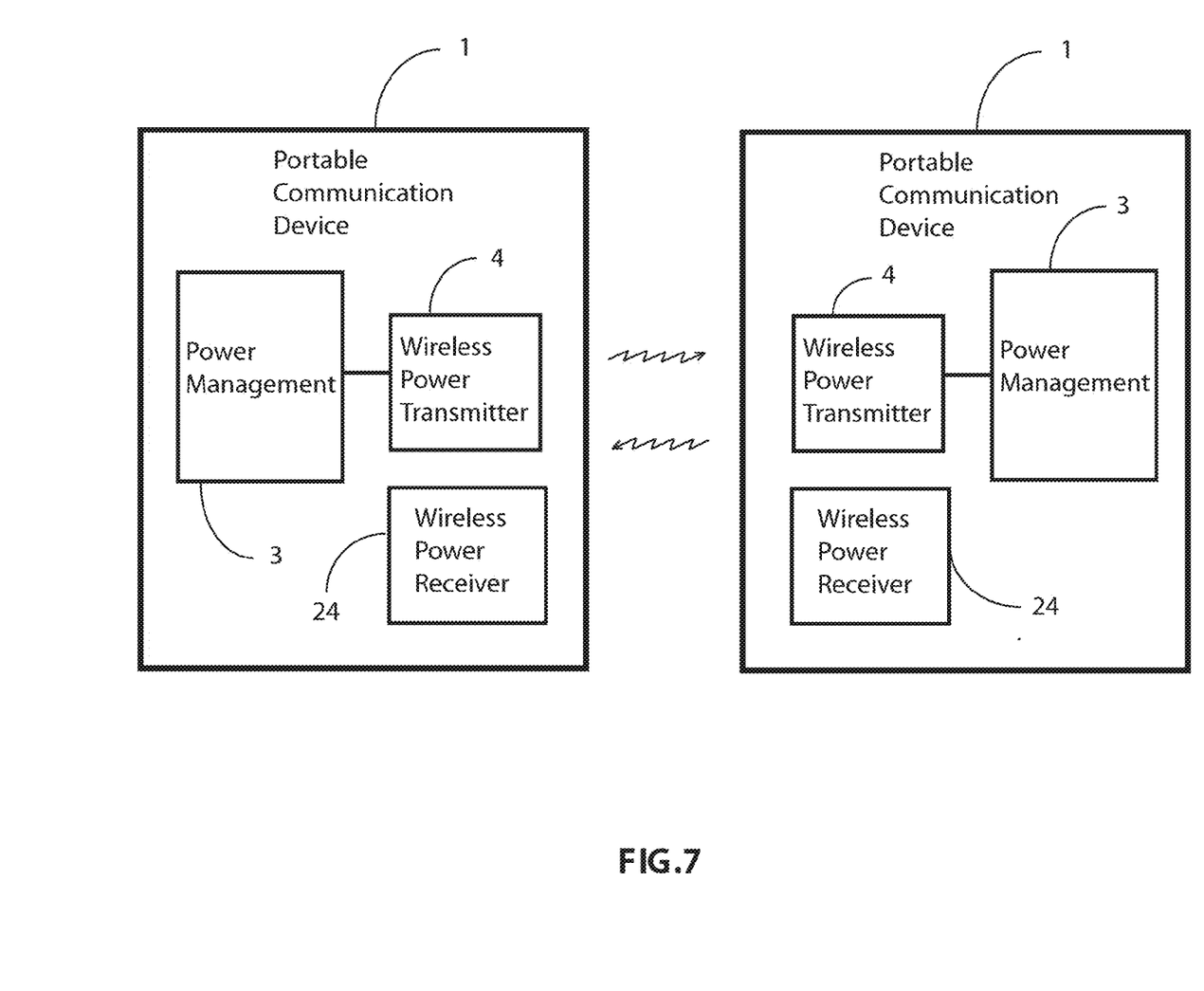
FIG. 7 shows a further embodiment of the present invention according to which two portable communication devices can exchange wireless power.

FIG. 7 shows a further embodiment of the present invention according to which two similar portable communication devices, both equipped with wireless power transmitters 4 and wireless power receivers 24, can exchange power wirelessly in and out in addition to exchange communication data. This could be used to equalize the remaining power in one of the cellular phones or to provide extra time to one of the smart-phones in case of emergency, even though many other uses are also possible.

H FIG. 8

Figure 8:
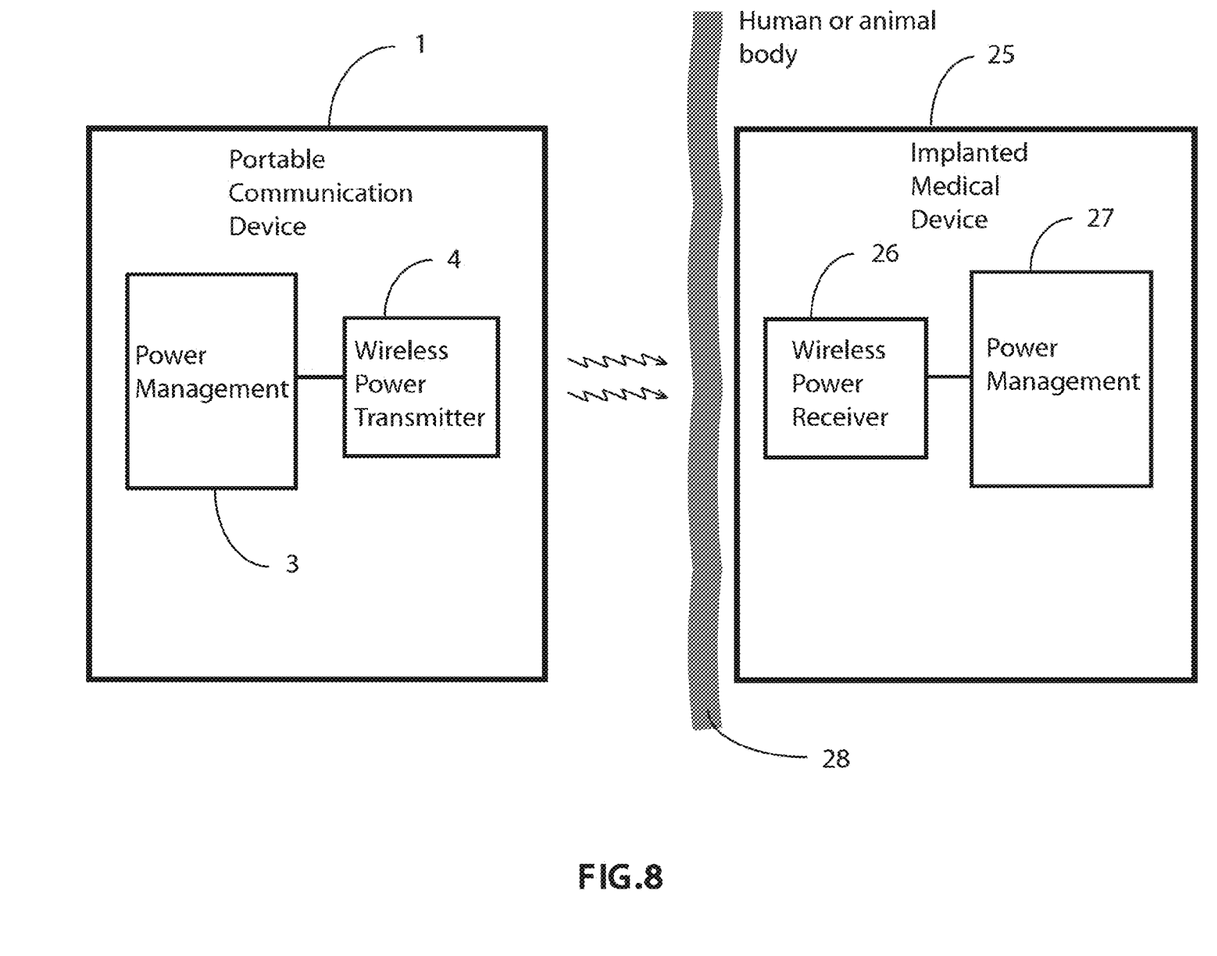
FIG. 8 shows a further embodiment of the present invention according to which the portable communication device transmits wireless power to an implanted medical devices.

FIG. 8 shows a further embodiment of the present invention according to which the device receiving the wireless power is an implanted medical device 25. This application is particularly interesting due to the level of power involved (generally not very large) and to the advantages that having the power transmitter 4 in the cellular phone or tablet may offer. Above all the advantage of transferring power through the skin 28 and/or human tissues so that a device 25 can be powered up and/or charged without the need to perform surgery to replace batteries.

As mentioned above the transfer of power may occur by means of RF wireless energy transferred or via ultrasound energy transfer. The programmability that may be performed by a program or by software application that runs on the portable communication device could include the level of power to be transmitted, the frequency of RF transmission or of the ultrasounds, the timing of the energy transmission and other parameters. The ability to process in short time diagnostic or physiological information that is transferred to the portable communication device is very desirable.

I FIG. 9

Figure 9:
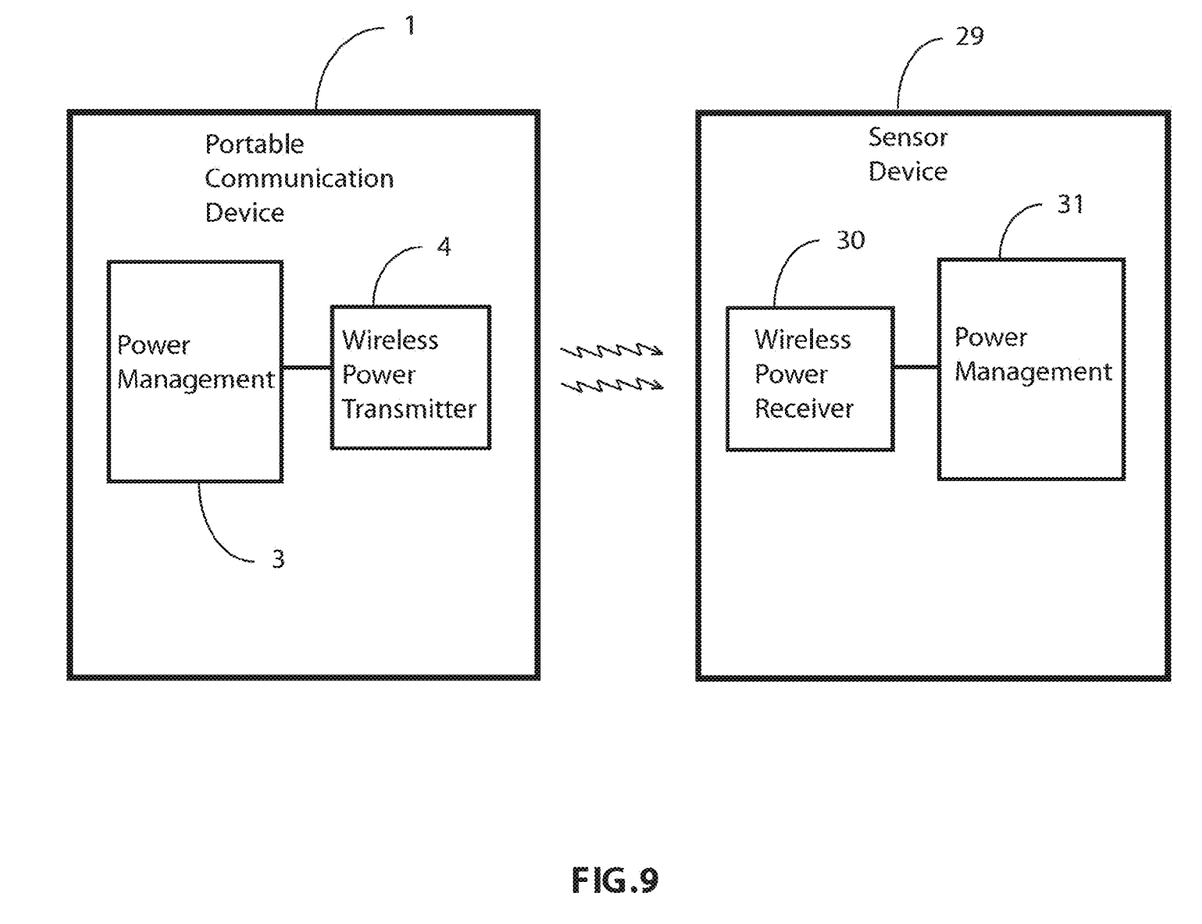
FIG. 9 shows a further embodiment of the present invention according to which the portable communication device transmits wireless power to a sensor device.

FIG. 9 shows a further embodiment of the present invention according to which the device receiving the wireless power is a sensor device 29. For example the sensor could be part of a vast network of sensors like what is envisioned for the so called "Internet Of Things". The sensor could be a sensor of temperature, humidity, smoke, particular chemical compost, vibration (for earthquake detection for example), pressure and many others. Furthermore if the sensor device communicates with the portable communication device 1, by exchanging data as well, valuable information can be exchanged in real time with the rest of the world.

J FIG. 10

Figure 10:
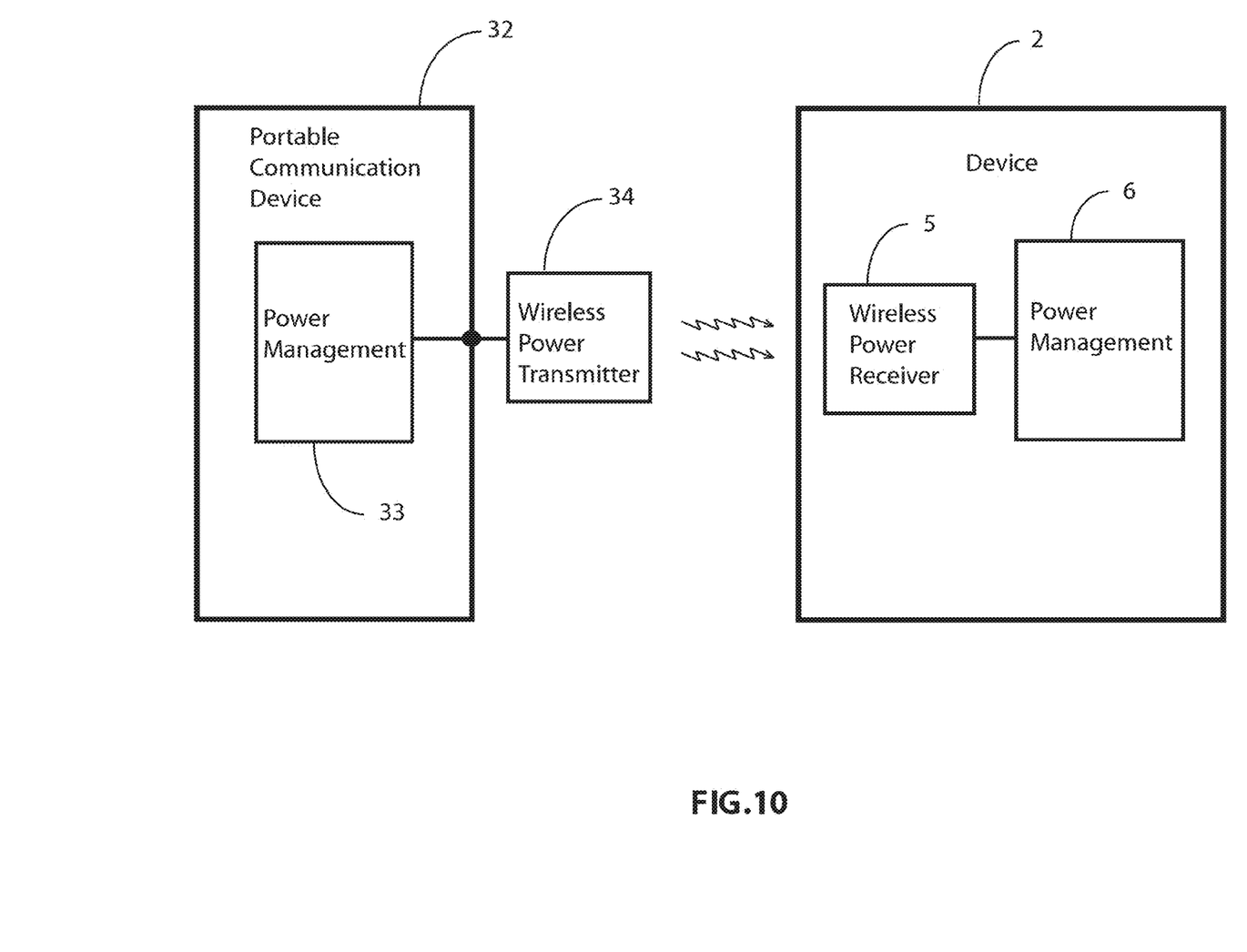
FIG. 10 shows a further embodiment of the present invention according to which the wireless power transmitter is coupled to the portable communication device.

FIG. 10 shows a further embodiment of the present invention according to which the wireless power transmitter 34 is not a part or component of the portable communication device 32, but it is external and connected to it. According to the embodiment of FIG. 10 the wireless power transmitter may be coupled to the portable communication device, so that the power to be wirelessly transmitted is provided by the portable communication device itself and, in addition, the device 32 may decode data that can be transmitted back from the device 2, by means of back scattering techniques (if the means for transferring power is Radio Frequency)

However the wireless power transmitter 34 may utilize ultrasounds, microwaves or optical mechanisms for transferring power. The advantage of using external wireless power transmitters is that the size constraints, that are limiting the solutions when the transmitter is internal to the portable communication device, are partially removed. This could be particularly advantageous for transferring power to implanted medical devices.

Although the present invention has been described above with particularity, this was merely to teach one of ordinary skill in the art how to make and use the invention. Many additional modifications will fall within the scope of the invention. Thus, the scope of the invention is defined by the claims which immediately follow.

What is claimed is:

1. A portable communication device comprising a transmitter of wireless power,
   wherein said transmitter of wireless power is embedded in said portable communication device;
   wherein said transmitter of wireless power is used to transmit wireless power and comprises a controller to control the operation of said transmitter of wireless power;
   wherein at least a portion of said transmitted wireless power is received by at least one wireless power receiver;
   wherein a second dedicated device is comprising said at least one wireless power receiver;
   wherein said second dedicated device is external to said portable communication device;
   wherein at least a portion of a wireless power received by said at least one wireless power receiver is utilized to store energy or to power up at least a section of said second dedicated device,
   wherein said transmitter of wireless power is selected from the group consisting of ultrasound, and optical power transmitter, and
   wherein said portable communication device belongs to the group of devices including cellular telephone devices, tablet devices, portable radio devices and telephone watch devices.

2. The portable communication device of claim 1, wherein said controller of said transmitter of wireless power is managed by executing a software program, and
   wherein said software program runs on a processing apparatus of said portable communication device.

3. The portable communication device of claim 1, wherein said transmitter of wireless power is transmitting wireless power simultaneously with transmission and reception of data to and from said second dedicated device, to and from a Wi Fi device or a cellular base station.

4. The portable communication device of claim 1, wherein said transmitter of wireless power operates at a frequency, and
   wherein said frequency is adaptively tuned to optimize the transfer of said wireless power to said at least one wireless power receiver.

5. The portable communication device of claim 1, further coupled to an external energy storing device.

6. The portable communication device of claim 1, wherein said second dedicated device belongs to the group of devices including electric glasses, 3D glasses, smart glasses and small displays devices.

7. The portable communication device of claim 1, wherein said transmitter of wireless power is an ultrasound power transmitter, and said second dedicated device is an implanted medical device.

8. The portable communication device of claim 1, wherein said second dedicated device is a sensor device.

9. A method for transmitting wireless power comprising:
   placing a wireless power transmitter in a portable communication device;
      wherein said wireless power transmitter comprises a controller to control the operation of said wireless power transmitter;
   transmitting wireless power with said wireless power transmitter;
   receiving at least a portion of said transmitted wireless power in at least one wireless power receiver;
      wherein a second dedicated device is comprising said at least one wireless power receiver;
      wherein said second dedicated device is external to said portable communication device;
      wherein at least a portion of wireless power received by said at least one wireless power receiver is utilized to store energy or to power up at least a section of said second dedicated device,
      wherein said wireless power transmitter is selected from the group consisting of ultrasound, and optical power transmitter, and
      wherein said portable communication device belongs to the group of devices including cellular telephone devices, tablet devices, portable radio devices and telephone watch devices.

10. The method for transmitting wireless power of claim 9, wherein said controller of said transmitter of wireless power is controlled by means of executing a software program, and
   wherein said software program runs on a processing apparatus of said portable communication device.

11. The method for transmitting wireless power of claim 9, wherein said transmitter of wireless power is transmitting wireless power simultaneously with transmission and reception of data to and from said second dedicated device, to and from a Wi Fi device or a base station.

12. The method for transmitting wireless power of claim 9, wherein said transmitter of wireless power is an ultrasound power transmitter, and said second dedicated device is an implanted medical device and an identification system is activated prior to transmitting wireless power.

13. The method for transmitting wireless power of claim 9, wherein said transmitter of wireless power is an ultrasound power transmitter, and said second dedicated device is an implanted medical device.

14. A method for transmitting wireless power comprising:
placing a wireless power transmitter in a portable communication device;
transmitting wireless power with said wireless power transmitter;
receiving at least a portion of said transmitted wireless power in at least one wireless power receiver;
   wherein a dedicated device is comprising said at least one wireless power receiver;
   wherein said dedicated device is external to said portable communication device;
   wherein at least a portion of wireless power received by said at least one wireless power receiver is utilized to store energy or to power up at least a section of said dedicated device,
   wherein said wireless power transmitter is selected from the group consisting of ultrasound, and optical power transmitter, and
   wherein said portable communication device belongs to the group of devices including cellular telephone devices, tablet devices, portable radio devices and telephone watch devices.

* * * * *